United States Patent [19]

Bueno C. et al.

[11] Patent Number: 5,078,788
[45] Date of Patent: * Jan. 7, 1992

[54] METHOD FOR THE DIRECT REDUCTION OF IRON

[75] Inventors: Henry R. Bueno C.; Oscar G. Dam G., both of Edo Bolivar, Venezuela

[73] Assignee: C.V.G. Siderurgica del Orinoco, C.A., Edo. Bolivar, Venezuela

[ * ] Notice: The portion of the term of this patent subsequent to Nov. 12, 2008 has been disclaimed.

[21] Appl. No.: 596,338

[22] Filed: Oct. 12, 1990

Related U.S. Application Data

[63] Continuation-in-part of Ser. No. 455,232, Dec. 22, 1989, which is a continuation-in-part of Ser. No. 115,911, Nov. 25, 1987, abandoned.

[51] Int. Cl.⁵ ............... C21B 13/02; C21B 13/14
[52] U.S. Cl. ............... 75/495; 423/651; 75/490; 75/451
[58] Field of Search ............... 423/138, 650, 651; 75/34, 36, 444, 445, 446, 450, 451, 491, 495

[56] References Cited

U.S. PATENT DOCUMENTS

| | | | |
|---|---|---|---|
| Re. 32,247 | 9/1986 | Stephens, Jr. | 75/446 |
| 3,210,180 | 10/1965 | Jukkoza | 75/451 |
| 3,303,017 | 2/1967 | Mayer | 75/451 |
| 3,364,011 | 9/1968 | Porter et al. | 75/451 |
| 3,375,098 | 3/1968 | Marshall | 75/496 |
| 3,562,780 | 2/1971 | Eisenberg | 75/451 |
| 3,635,456 | 1/1972 | Anthes et al. | 266/197 |
| 3,936,296 | 2/1976 | Campbell | 75/446 |
| 3,985,547 | 10/1976 | Iacotti et al. | 75/451 |
| 4,045,214 | 8/1977 | Wetzel et al. | 75/446 |
| 4,046,557 | 9/1977 | Beggs | 75/496 |
| 4,253,867 | 3/1981 | Price-Falcon et al. | 75/496 |
| 4,261,734 | 4/1981 | Price-Falcon et al. | 75/495 |
| 4,425,159 | 1/1984 | Nixon | 75/505 |
| 4,528,030 | 7/1985 | Vera et al. | 75/496 |
| 4,566,904 | 1/1986 | von Bogdandy et al. | 75/446 |
| 4,668,284 | 5/1987 | Vera et al. | 75/495 |
| 4,880,458 | 11/1989 | Martinez-Vera et al. | 75/498 |
| 4,940,488 | 7/1990 | Maeda et al. | 75/446 |
| 4,946,498 | 8/1990 | Weber | 75/446 |

FOREIGN PATENT DOCUMENTS

| | | | |
|---|---|---|---|
| 534830 | 12/1956 | Canada | 75/451 |
| 1268478 | 6/1961 | France | 57/451 |

Primary Examiner—Gary P. Straub
Attorney, Agent, or Firm—Bachman & LaPointe

[57] ABSTRACT

A process for the direct reduction of metal oxides containing iron to obtain a DRI metallized iron product comprises feeding heavy hydrocarbon oil under controlled conditions to a cracking zone upstream of the reduction reactor so as to form a cracked product rich in $CH_4$ and thereafter feeding said cracked product directly to the reaction zone wherein a reformed reducing gas rich in $H_2$ and CO is formed and contacted with said iron oxide material thereby effecting reduction of said iron oxide material in the reaction zone.

12 Claims, 1 Drawing Sheet

METHOD FOR THE DIRECT REDUCTION OF IRON

CROSS REFERENCE TO RELATED APPLICATIONS

This is a continuation-in-part of co-pending U.S. patent application Ser. No. 455,232, filed Dec. 22, 1989, for METHOD AND APPARATUS FOR THE DIRECT REDUCTION OF IRON ALLOWED which in turn is a continuation-in-part of co-pending U.S. patent application Ser. No. 115,911, filed Nov. 25, 1987, for METHOD AND APPARATUS FOR THE DIRECT REDUCTION OF IRON, abandoned.

BACKGROUND OF THE INVENTION

The present invention is drawn to a process for the direct reduction of metal oxides containing iron to a metallized iron product.

The direct reduction of iron oxide, in forms such as pellets or lump ore, to metallic iron in the solid state has become a commercial reality throughout the world in recent years. The combined annual capacity of direct reduction plants currently in operation or under construction is in excess of 15 million metric tons of direct reduced iron product, which is used primarily for feedstock in electric arc steelmaking furnaces. The world demand for additional direct reduced iron is projected to increase at a substantial rate for many years to satisfy a growing world need for such feedstock, as additional electric arc furnace steelmaking plants are constructed.

Known processes for the direct reduction of iron oxide to metallic iron utilize a reformed gas as the reducing agent. Natural gas is used as a source for generating the reformed gas. The reformed gas for use in the direct reduction process is generated in a unit called a reformer by contacting the natural gas with an oxygen containing material in the presence of a catalyst, usually a nickel catalyst, which activates the reformation reaction of the natural gas so as to yield a reformed gas which is rich in $H_2$ and CO. The reformed gas which is collected from the reformer is thereafter fed to a reduction reactor containing the iron oxide material wherein the direct reduction reaction is carried out. Thus, direct reduction processes heretofore known require two distinct reaction zones for carrying out the actual direct reduction process. In these conventional processes it is required that the reformed gas product in the first zone be treated prior to entering the reduction zone in order to remove $CO_2$ and/or water vapor.

As noted above, natural gas is used as a source for generating the reformed gas. As natural gas is a valuable natural resource which has many uses, it would be highly beneficial to employ as a source for generating the reformed gas a resource other than natural gas. In particular, it would be highly beneficial to be able to use as a source for generating the reform gas heavy hydrocarbon oils which are readily available. Heretofore it has been impractical to employ heavy hydrocarbon oils in the known conventional direct reduction processes noted above due to the presence of sulfur in the heavy hydrocarbon oil which poisons the catalyst employed in the reformer of the known direct reduction processes. As a result of the foregoing, any prior art process employing heavy hydrocarbon oils required treatment of the heavy hydrocarbon oil to desulfurize the heavy hydrocarbon oil so as to prevent poisoning of the catalyst employed in the reformer of the known direct reduction processes.

Naturally, it would be highly desirable to provide a process which permits the use of heavy hydrocarbon oils having high sulfur contents as a source for generating reformed gas for use in the direct reduction of iron oxides to metallic iron which process does not require prior treatment of the heavy hydrocarbon oil.

Accordingly, it is the principal object of the present invention to provide an improved process for the direct reduction of metal oxides containing iron to a metallized iron product.

It is a particular object of the present invention to provide a process as aforesaid which employs heavy hydrocarbon oil as a natural gas source for generating the reformed gas used in the direct reduction process.

It is a further object of the present invention to provide a process as aforesaid wherein gas reformation and direct reduction of the metal oxides is carried out in a single reaction zone of the direct reduction reactor.

It is a still further object of the present invention to provide a process as aforesaid wherein the DRI material in the single reaction zone of the direct reduction reactor is used as a catalyst to produce a reformed gas directly in the reaction zone which contacts the metal oxides in the reaction zone so as to reduce same to a metallized iron product.

Further objects and advantages of the present invention will appear hereinbelow.

SUMMARY OF THE INVENTION

In accordance with the present invention, the foregoing objects and advantages are readily obtained.

The present invention is drawn to an improved process for the direct reduction of metal oxides containing iron to a metallized iron product which process employs as a source for generating the reformed gas out in the direct reduction of the iron oxide particles a heavy hydrocarbon oil.

The process of the present invention comprises providing a reduction reactor having a single reaction zone containing a bed of partially metallized iron oxide material and direct reduced iron (DRI) within the single reaction zone. A combustion chamber is provided immediately upstream of the single reaction zone. A heavy hydrocarbon oil is atomized with top gas recycled from the reduction reactor so as to improve combustion efficiency and is fed to a first zone of the combustion chamber where it is admixed with an oxidant which is preheated so as to form an oxygen enriched mixture. The mixture is thereafter combusted under controlled temperature and time conditions so as to form a cracked product containing a maximized amount of natural gas ($CH_4$). The cracked product is thereafter mixed with a portion of the top gas recycled from the reduction reactor in a second zone of the combustion chamber so as to form a reactor feed gas mixture which comprises $CH_4$, $CO_2$ and $H_2O$. The reactor feed gas mixture is thereafter fed from the second zone of the combustion chamber to the single reaction zone of the reduction reactor under controlled temperature conditions wherein the direct reduced iron acting as a catalyst is contacted by the feed gas mixture so as to form a reformed reducing gas rich in $H_2$ and CO in the reaction zone which reformed gas is contacted by the iron oxide material in the reaction zone to effect reduction of the same to a DRI metallized iron product.

In accordance with the present invention, the reformed gas generated in the reaction zone consists essentially of $H_2$ from 42% to 48% by volume, CO from 30% to 36% by volume, $CO_2$ from 2% to 4% by volume, $CH_4$ from 2% to 5% by volume, $N_2$ from 10% to 16% by volume, water vapor from 2% to 5% by volume and $SO_2$ from 1% to 2% by volume and has an oxidation grade in the order of 0.05 to 0.09 and a reducing power in the order of 11 to 29. In order to provide sufficient energy for the reformation of the feed gas, it is preferred in accordance with the process of the present invention that the feed gas mixture be fed to the single reaction zone at a temperature of from about 1000° to 1150° C. and that the ratio of $CH_4/CO_2+H_2O$ in the feed gas mixture is from about 0.6:1 to 0.7:1. In accordance with a further feature of the process of the present invention, it is preferred that the atomized heavy crude is admixed with air enriched with oxygen wherein the ratio of air to oxygen is from about 7:1 to 7:2. In addition, as noted above, the feed gas mixture fed to the single reaction zone at the controlled temperature should comprise $CH_4$, $CO_2$ and $H_2O$ and is preferably a mixture which consists essentially of from 32% to 38% by volume $H_2$, from 15% to 22% by volume CO, from 16% to 20% by volume $CO_2$, from 15% to 20% by volume $CH_4$, from 10% to 18% by volume $N_2$, from 4% to 8% by volume steam, from 2% to 4% by volume of $C_2H_6$ and from 1% to 3% by volume of $SO_2$.

The process of the present invention allows for a single reaction zone of a direct reduction reactor to be employed for the simultaneous formation of the reformed gas for use in the reduction process and the actual direct reduction of the iron containing oxide material wherein a heavy hydrocarbon oil is used as a source for generating the reformed gas without requiring pretreatment of the heavy hydrocarbon oil for desulfurizing same. Accordingly, it has been found that the process of the present invention which employs heavy hydrocarbon oil as a natural gas source for use in the simultaneous reforming-reduction process in a single reaction zone in a reduction reactor greatly improves the overall efficiency of direct reduction processes heretofore known.

DETAILED DESCRIPTION

The present invention is drawn to an improved process for the direct reduction of metal oxides containing iron to a metallized iron product which process employs as a source for generating the reformed gas out in the direct reduction of the iron oxide particles a heavy hydrocarbon oil.

Figure 1:
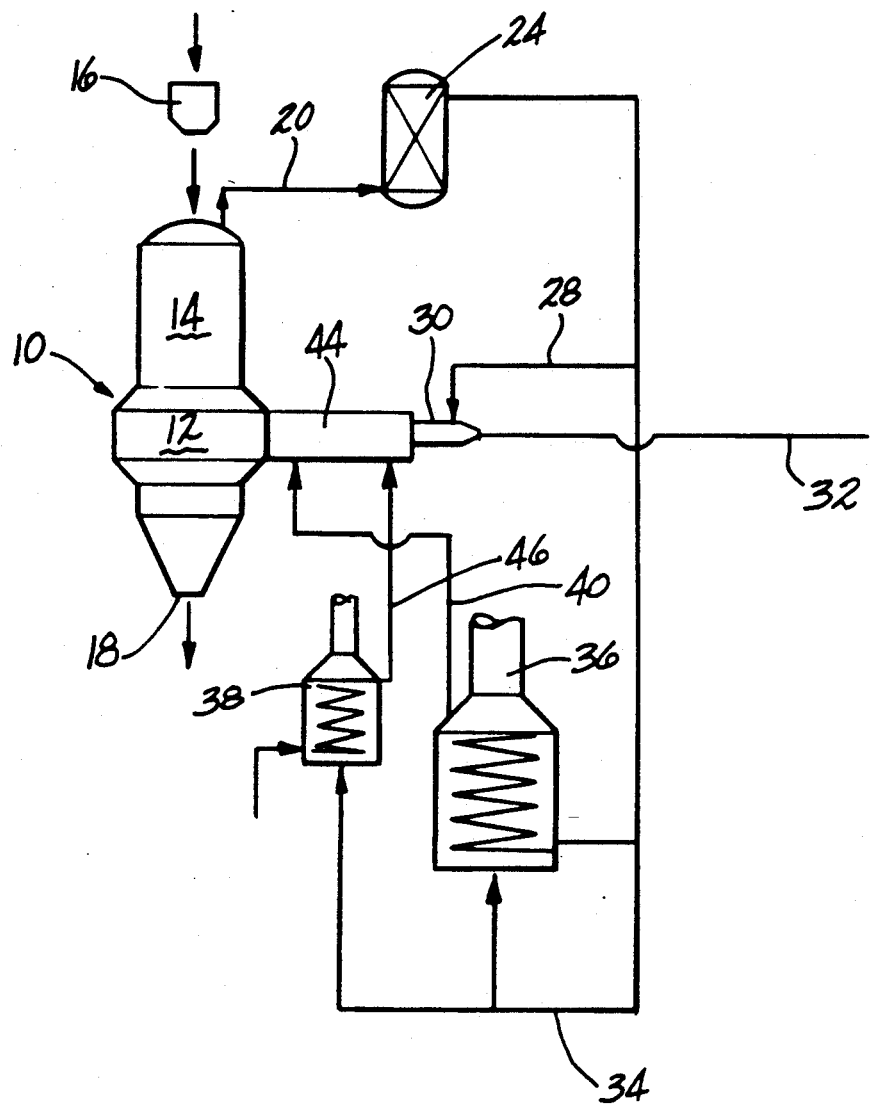
FIG. 1 is a schematic illustration of an apparatus for carrying out the process of the present invention.
Figure 2:
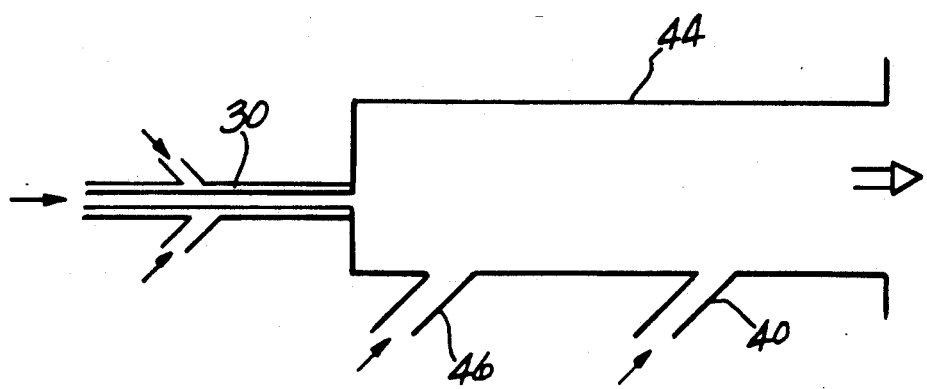
FIG. 2 is a schematic illustration of a combustion zone employed in the process of the present invention for cracking the heavy hydrocarbon oil feed and forming said gas mixture for the reduction reactor.

With reference to FIG. 1, the apparatus employed in the process of the present invention comprises a reduction reactor 10 having a combined single reaction zone 12 wherein the reformed gas is formed and the reduction reaction takes place simultaneously. Above the single reaction zone 12 is a preheating zone 14 wherein the iron containing metal oxides to be reduced are preheated. The iron containing metal oxide is fed to zone 14 from, for example, a bin 16. The DRI produced in the reforming-reduction reaction zone 12 is cooled and discharged from the reduction reactor 10 via outlet 18.

Top gas from the reduction reactor is removed via line 20 and from there is conducted to a washing unit 24 where the gas is cooled to eliminate reduction water. The top gas in the washer 24 is also cleaned of solid particles which might be contained therein.

The iron-containing metal oxides introduced into the reactor may be in pellet form and typically contain from about 63 to 68 wt. % iron. The DRI that is obtained by the process of the present invention typically contains from about 85 to 90 wt. % iron and 3 to 4 wt. % carbon.

The top gas removed via line 20 has a composition as follows:
from about 27 to 36% by volume hydrogen;
from about 17 to 23% by volume carbon monoxide;
from about 15 to 20% by volume $CO_2$;
from about 3 to 8% by volume $CH_4$;
from about 14 to 20% by volume nitrogen; and
from about 12 to 20% by volume steam.

The temperature of the top gas which leaves the reactor 10 is typically in the range of from about 300° to 400° C. and has an oxidation grade (degree of oxidation) $n_o$ of from about 0.33 to 0.38 wherein the oxidation grade is defined as follows:

$$\eta_o = \frac{CO_2 + H_2O}{CO_2 + H_2O + CO}$$

As noted above, the top gas is fed to washer 24 and the gases are cooled to a temperature of about 40° to 60° C. and the water content of the top gases is reduced to a level of from about 2 to 6% by volume.

The cooled and dewatered top gas is thereafter, in accordance with the present invention, divided into three streams. The first stream is delivered via line 28 to an atomizer 30 for atomizing a heavy hydrocarbon oil fed to the atomizer 30 via line 32. In accordance with the process of the present invention, the flow rate of top gas to heavy hydrocarbon oil fed to the atomizer 30 is from about 3 to 4 $NM^3$ of gas per liter of heavy hydrocarbon. Typical heavy hydrocarbon oils which are suitable for use in the process of the present invention have API gravities of about 20° API or less and viscosities of about 100 centipoise or greater at 150° F.

Another stream of the top gas is fed via line 34 and is used as a heat source for preheaters 36 and 38. The third stream of top gas, which is the principal amount of the top gas, is delivered to preheater 36 and from there via line 40 to the second zone of a combustion chamber 44 for reasons to be discussed hereinbelow. In accordance with the process of the present invention, the third stream of top gas is preheated in preheater 36 to a temperature of from about 700° to 850° C. and preferably from about 750° to 800° C. The top gas is fed to the second zone of the combustion chamber 44 at a flow rate of from about 800 to 1000 $MN^3$ per ton of DRI within the reaction zone.

The atomized heavy hydrocarbon oil is fed to a first zone of combustion chamber 44 where it is admixed with an oxidant so as to form an oxygen enriched mixture. In accordance with the present invention, the preferred oxidant is oxygen enriched air wherein the ratio of air to $O_2$ is from about 7:1 to 7:2. The oxygen enriched air is preferably preheated in preheater 38 and fed via line 46 to the first zone of combustion chamber 44 at a temperature of from about 700° to 800° C. The mixture of atomized heavy hydrocarbon oil and oxygen is combusted in the first zone at a temperature of from about 1200° to 1400° C. so as to crack the heavy hydrocarbon and form a cracked product which is rich in $CH_4$ from a period of from about 0.2 to 1.0 seconds. The time and temperature of the hydrocracking is controlled so as to obtain a cracked product having a maximized $CH_4$ level.

The cracked product which is rich in $CH_4$ is thereafter fed to a second zone of the combustion chamber 44 where it is admixed with the top gases fed from preheater 36 so as to form a feed gas mixture which consists essentially of from 32% to 38% by volume $H_2$, from 15% to 22% by volume CO, from 16% to 20% by volume $CO_2$, from 15% to 20% by volume $CH_4$, from 10% to 18% by volume $N_2$, from 4% to 8% by volume steam, from 2% to 4% by volume of $C_2H_6$ and from 1% to 3% by volume of $SO_2$ which is at a temperature of from about 1000° to 1150° C. The feed gas mixture is characterized by a $CH_4/(CO_2+H_2O)$ of from about 0.6:0.7 and an oxidation grade of about 0.30 and 0.35. Thereafter, the feed gas mixture is fed to the reforming-reduction zone 12 at a flow rate of 1000 to 1200 $NM_3$ per ton of DRI and contacts the hot DRI in the reaction zone 12 which catalysis the reforming reaction so as to form a reformed gas under the following exothermic reaction which cools the reaction zone 12 to a temperature of from about 750° to 850° C.:

$$CH_4 + CO_2 = 2H_2 + CO$$

As noted, the reformed gas generated in the reforming reaction zone 12 has a temperature of from about 750° to 850° C. and consists essentially of $H_2$ from 42% to 48% by volume, CO 30% to 36% by volume, $CO_2$ 2% to 4% by volume, $CH_4$ 2% to 5% by volume, $N_2$ 10% to 16% by volume, water vapor 2% to 5% by volume and $SO_2$ 1% to 2% by volume. The reformed gas is characterized by an oxidation grade of between 0.05 to 0.09 and a reducing power in the order of 11 to 29 wherein the reducing power is defined as follows:

$$\eta_R = \frac{CO + H_2}{CO_2 + H_2O}$$

The reducing power of the reformed gas permits, in accordance with the process of the present invention, one to obtain a highly metallized product which results in 90 to 92% efficiency and a DRI product which contains from about 3 to 4% carbon. The sulfur content of the product obtained is typical to that obtained in prior art DRI processes employing pure methane gas as a source for generating the reformed gas. The DRI is not poisoned by the sulfur in the heavy hydrocarbon oil employed in the process of the present invention as the sulfur contents of the heavy hydrocarbon oil reacts to form $SO_2$ and $SO_3$ in the reaction zone which is carried off in the top gas and removed in the washer 24.

Accordingly, the process of the present invention offers an efficient and effective process for the direct reduction of metal oxides containing iron to obtain a DRI metallized iron product wherein a heavy hydrocarbon oil can be used as the source of $CH_4$ for generating reformed gas directly in the reforming-reduction zone 12 of the reduction reactor.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for the direct reduction of metal oxides containing iron to obtain a direct reduced iron, said process consisting essentially of:
    (a) providing a reforming-reduction reactor containing a bed of partially metallized iron oxide material and a bed of direct reduced iron within said reforming-reduction reactor;
    (b) feeding metal oxides containing iron to said reforming-reduction reactor;
    (c) providing a combustion chamber upstream of said reforming-reduction reactor;
    (d) atomizing a heavy hydrocarbon oil;
    (e) feeding said atomized heavy hydrocarbon oil to a said combustion chamber;
    (f) admixing said atomized heavy hydrocarbon oil with preheated air to form an air-heavy hydrocarbon oil mixture;
    (g) partially combusting said mixture to form a cracked product comprising more than 15 to 20% $CH_4$;
    (h) admixing said cracked product with top gas from said reforming-reduction reactor to form a reforming-reduction reactor feed gas mixture comprising 15 to 20% by volume $CH_4$ and 16 to 20% by volume $CO_2$;
    (i) feeding said feed gas mixture to said reforming-reduction reactor;
    (j) contacting said feed gas in said reforming-reduction reactor with said direct reduced iron so as to form a reformed reducing gas comprising $H_2$ and CO; and
    (k) contacting said partially metallized iron oxide material in said reforming-reduction reactor so as to effect reduction to obtain a DRI metallized iron.

2. A process according to claim 1 wherein said feed gas mixture fed of step (i) to said reforming reducing reactor is fed at a temperature of from about 1000°-1150° C.

3. A process according to claim 1 wherein the ratio of $CH_4$ to $CO_2$ and $H_2O$ in said feed gas mixture is from about 0.6:1 to 0.7:1.

4. A process according to claim 1 wherein said preheated air admixed with said atomized heavy crude is preheated to a temperature of from about 700° to 850° C.

5. A process according to claim 1 wherein said top gas admixed with said cracked product is preheated to a temperature of from about 700° to 850° C.

6. A process according to claim 1 wherein the flow rate of top gas to heavy hydrocarbon oil feed is from about 3 to 4 $NM^3$/liter.

7. A process according to claim 4 wherein said air is enriched with oxygen wherein the ratio of air to added oxygen is from about 7:1 to 7:2.

8. A process according to claim 1 wherein the flow rate of feed gas mixture to direct reduced iron in step (i) is from about 1000 to 1200 $NM^3$/ton DRI.

9. A process according to claim 1 wherein said reformed gas of step (i) consists essentially of $H_2$ from 42% to 48% by volume, CO 30% to 36% by volume, $CO_2$ 2% to 4% by volume, $CH_4$ 2% to 5% by volume, $N_2$ 10% to 16% by volume, water vapor 2% to 5% by volume and $SO_2$ 1% to 2% by volume.

10. A process according to claim 9 wherein the reformed gas has an oxidation degree in the range of from about 0.05 to 0.09 and a reducing power of from about 11 to 29.

11. A process according to claim 1 wherein said feed gas mixture of step (h) consists essentially of from 32% to 38% by volume $H_2$, from 15% to 22% by volume CO, from 16% to 20% by volume $CO_2$, from 15% to 20% by volume $CH_4$, from 10% to 18% by volume $N_2$, from 4% to 8% by volume steam, from 2% to 4% by volume of $C_2H_6$ and from 1% to 3% by volume of $SO_2$.

12. A process according to claim 1 wherein said heavy hydrocarbon oil is atomized with top gas recycle from said reforming reduction reactor.

* * * * *